US008948610B2

(12) United States Patent
Azadeh et al.

(10) Patent No.: US 8,948,610 B2
(45) Date of Patent: Feb. 3, 2015

(54) DATA SIGNAL THRESHOLD DETECTION AND/OR RECOVERY IN OPTICAL AND/OR OPTOELECTRIC RECEIVERS AND/OR TRANSCEIVERS

(75) Inventors: Mohammad Azadeh, Northridge, CA (US); Near Margalit, Westlake Village, CA (US)

(73) Assignee: Source Photonics, Inc., Chatsworth, CA (US)

( * ) Notice: Subject to any disclaimer, the term of this patent is extended or adjusted under 35 U.S.C. 154(b) by 405 days.

(21) Appl. No.: 13/282,191

(22) Filed: Oct. 26, 2011

(65) Prior Publication Data

US 2013/0108280 A1 May 2, 2013

(51) Int. Cl.
H04B 10/06 (2006.01)
H04L 25/06 (2006.01)
H04L 25/10 (2006.01)
H04B 10/69 (2013.01)

(52) U.S. Cl.
CPC ............................... H04B 10/695 (2013.01)
USPC ............................ 398/202; 375/317; 375/318

(58) Field of Classification Search
CPC . H04B 10/691; H04B 10/6933; H04B 10/695
USPC ............ 398/202; 375/316–318; 455/130, 334
See application file for complete search history.

(56) References Cited

U.S. PATENT DOCUMENTS

| 7,183,540 | B2 | 2/2007 | Zhang et al. | |
|---|---|---|---|---|
| 2003/0086516 | A1* | 5/2003 | Wagner | 375/350 |
| 2008/0092675 | A1* | 4/2008 | Komine | 74/5.4 |
| 2008/0258563 | A1* | 10/2008 | Hodges | 307/112 |
| 2008/0310861 | A1* | 12/2008 | Wong et al. | 398/210 |
| 2009/0009246 | A1* | 1/2009 | Hara et al. | 330/254 |

OTHER PUBLICATIONS

Gu, Wen; Project Report on WDM/TDM-PON; School of Electrical and Computer Engineering, University of Oklahoma—Tulsa; Created on May 7, 2007; http://tulsagrad.ou.edu/samuel_cheng/computer_network_2007/Wen%20Gu%20-%20Presenation%20on%20WDMTDM-Pon.pdf.
Azadeh, Mohammad and Margalit, Near; U.S. Patent Application for "Data Signal Detection in Optical and/or Optoelectronic Receivers and/or Transceivers"; SP-093-U; filed Oct. 26, 2011.

* cited by examiner

Primary Examiner — David Payne
Assistant Examiner — Casey Kretzer
(74) Attorney, Agent, or Firm — Andrew D. Fortney; Central California IP Group, P.C.

(57) ABSTRACT

Methods for receiving a signal and a detection circuit are disclosed. The detection circuit and related methods may be useful for the fast and accurate receiving of data signals. The detection circuit generally comprises a first circuit having a first time constant, a second circuit having (i) a common input with the first circuit and (ii) a second time constant, the second time constant being less than the first time constant, and a switch configured to (i) charge the first circuit with an input signal when the switch is in a first state, and (ii) charge or discharge the second circuit with the input signal when the switch is in a second state, the switch having the second state when the input signal is no longer received at the common input.

20 Claims, 4 Drawing Sheets

DATA SIGNAL THRESHOLD DETECTION AND/OR RECOVERY IN OPTICAL AND/OR OPTOELECTRIC RECEIVERS AND/OR TRANSCEIVERS

FIELD OF THE INVENTION

The present invention generally relates to optical signal reception. More specifically, embodiments of the present invention pertain to methods and apparatuses for receiving optical signals using an optical and/or optoelectronic receiver and/or transceiver, wherein the optical signals may have different common-mode voltages.

DISCUSSION OF THE BACKGROUND

Passive optical networks (PONs) can be utilized to provide data from one or more user nodes (e.g., an optical network unit [ONU], optical network terminal [ONT], etc.) to a central node (e.g., a central office, such as or including an optical line terminal [OLT]) using optical signal media (e.g., a fiber optic cable, a fiber optic link, etc.). In some PONs, time-division multiplexing (TDM) is used so that multiple bit streams or data signals (e.g., data packets) are alternately transmitted by one or more ONUs over a single communication channel. That is, in PONs employing TDM, a first ONU can transmit optical data during an allocated or predetermined time slot, and a second ONU can transmit optical data over the same media in the next allocated or predetermined time slot.

For a data packet to be accurately received by the OLT (e.g., including a burst mode optical receiver), a decision threshold must be set. That is, based on the amplitude or common-mode voltage of the received data signal, a decision threshold is set, where data having an amplitude above the decision threshold are considered to have a binary logic high state, and data having an amplitude below the decision threshold are considered to have a binary logic low state. For the decision threshold to be set correctly and/or accurately, the common-mode (or average) voltage of the incoming signal must be known.

In some embodiments, an ONU may be located at a first distance from an OLT, and provide data having a first common-mode voltage or amplitude $A_1$ to the OLT. A second ONU may be located at a further, second distance from the OLT, and provide data having a second common-mode voltage or amplitude $A_2$ to the OLT. In such circumstances, amplitude $A_2$ is generally less than amplitude $A_1$. Stated differently, optical packets received by the OLT from different ONUs may have different amplitudes (e.g., amplitudes $A_1$ and $A_2$). Thus, use of a common-mode voltage (e.g., $V_{CM}$) established for the first packet may result in inaccurate reception of the second packet, since the amplitudes of the received packets are not necessarily equal (e.g., $A_2$ may be significantly less than $A_1$).

Specifically, as illustrated in graph 10 of FIG. 1, a first data signal 20 having an amplitude $A_1$ and a common-mode voltage $V_{CM}$ is received by an optical receiver (not shown). At time $t_1$, the first data signal 20 is no longer received, so the common-mode voltage $V_{CM}$ (and thus, the voltage threshold 25) decreases. At time $t_2$, a second data signal 30 having an amplitude $A_2$ less than $A_1$ is received. However, the amplitude $A_2$ is also less than $V_{CM}$ (and the voltage threshold 25) at time $t_2$. The $V_{CM}$ decay after time $t_1$ (e.g., as represented by voltage threshold 25) represents the discharge of a stored charge in an RC circuit in the receiver. As can be seen in FIG. 1, voltage threshold 25 has a value greater than $A_2$ for data signal 30 values initially received after time $t_2$, in which case a potential problem arises.

More specifically, the voltage threshold for first data signal 20 is set equal to the common-mode voltage $V_{CM}$ (e.g., using the RC circuit in the receiver). As discussed above, at time $t_1$, the common-mode voltage $V_{CM}$ (and thus, the voltage threshold 25) begins to decrease, and continues to decrease after time $t_2$. However, data (e.g., a data packet) in data signal 30 received just after time $t_2$ is processed while the voltage threshold 25 is above the common-mode voltage of the second data signal 30. This relatively long decay in the voltage threshold 25 is caused by the RC time constant of the RC circuit in the receiver. Such RC circuitry may not be capable of processing certain data signals having different amplitudes sufficiently quickly. Thus, optical receiver circuitry using voltage threshold 25 for the data signal 30 transmitted by the second ONU may result in some of the data signal 30 being identified as having a low binary logic state, even when it does not.

Stated differently, since the peak amplitude (e.g., $A_2$) of the second data signal 30 is less than the $V_{CM}$ of the first data signal 20, a portion of the data (e.g., a header for data signal 30) transmitted by the second ONU may always be below the voltage threshold 25, regardless of its actual value. The data arriving before time $t_3$ therefore may be erroneously considered to have a low binary logic state, although the data would be correctly identified as having a high binary logic state once the voltage threshold 25 decreases to the common-mode voltage (e.g., the average voltage) of the second data signal 30.

Additionally, in most PONs having time-multiplexed signal transmission, data packets are transmitted close together to maximize bandwidth efficiency. Thus, the receiver must quickly determine the presence of and/or a decision threshold voltage for data signals having different common-mode voltages. However, current optical receivers employing feedback configurations to determine an optical data signal decision threshold may not be capable of processing such high bandwidth data signals sufficiently quickly. For example, in some optical receivers using feedback configurations, the sequence of steps for determining the common-mode voltage and decision threshold includes converting the received optical data signal to an electrical signal, amplifying the electrical signal, comparing the amplified electrical signal to a predetermined decision threshold, providing a feedback signal to an input of the amplifier, then adjusting the predetermined decision threshold based on the feedback signal. Such a configuration, however, increases data processing time, and data at the beginning of the data packet can be erroneously processed (e.g., treated as all binary logic "0"s) during the time that the decision threshold is being determined. Thus, the optical and optoelectronic networking industries seek optical and/or optoelectronic receivers and/or transceivers capable of quickly and accurately detecting a new data signal and determining a decision threshold for data signals received from multiple ONUs at various amplitudes.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is directed to a detection circuit comprising a first circuit having a first time constant, a second circuit having (i) a common input with said first circuit and (ii) a second time constant, the second time constant being less than the first time constant, and a switch configured to (i) charge the first circuit with an input signal when the switch is in a first state, and (ii) charge or discharge the second circuit with the input signal when the switch is in a second state, the switch having the second state when the input signal is no longer received at the common input. In various embodiments, the first circuit comprises a first RC circuit, and the second circuit comprises a second RC circuit. In further embodiments, each of the first and second RC circuits comprises a first resistor and a first capacitor, and one of the first and second RC circuits comprises a third RC component.

Additionally, embodiments of the present invention relate to an optical and/or optoelectronic receiver and/or transceiver and methods of receiving a plurality of signals. The optical receiver generally comprises the detection circuit discussed above, a microcontroller or microprocessor configured to execute one or more commands to open or close the switch, and a memory in electrical communication with the microcontroller or microprocessor. In some embodiments, the microprocessor or microcontroller is further configured to execute one or more commands configured to recharge the first circuit when the input signal is received again at the common input. In further embodiments, each of the first circuit and the second circuit have a common differential output, and the optical receiver comprises a differential amplifier configured to receive the common differential output of the first and second circuits.

The method of receiving a plurality of signals generally comprises charging a first circuit having a first time constant with a first signal of the plurality of signals, the first signal having a first common-mode voltage, and when the first signal is no longer received, charging or discharging a second circuit having (i) a common input with the first circuit and (ii) a second time constant less than the first time constant. In some embodiments, charging or discharging the second circuit comprises opening or closing a switch. In additional embodiments, the first circuit comprises a first RC circuit, and the second circuit comprises a second RC circuit.

Various embodiments and/or examples disclosed herein may be combined with other embodiments and/or examples, as long as such a combination is not explicitly disclosed herein as being unfavorable, undesirable or disadvantageous.

The present detection circuit advantageously provides fast and accurate data signal detection in optical and/or optoelectronic receivers and/or transceivers. By utilizing the present detection circuit, an optical receiver can quickly determine a common-mode voltage of a received data signal and subsequently determine or set a decision threshold for the binary logic states of the received signal. The present "feed-forward" circuitry can determine a decision threshold within a relatively fast time frame (e.g., within 10 ns of the beginning of a new data packet).

These and other advantages of the present invention will become readily apparent from the detailed description of various embodiments below.

DETAILED DESCRIPTION

Figure 1:
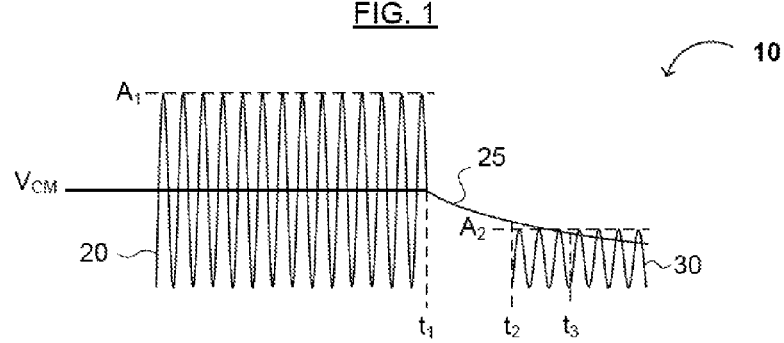
FIG. 1 is a graph illustrating a problem that can arise when data signals from different sources have different voltage thresholds (e.g., common-mode voltages) in existing optical or optoelectronic circuitry.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "optical" and "optoelectronic" are generally used interchangeably herein, and use of any one of these terms also includes the others, unless the context clearly indicates otherwise. Additionally, the term "transceiver" refers to a device having at least one data receiver and at least one data transmitter, and use of the term "transceiver" also includes the terms "receiver" and "transmitter," unless the context clearly indicates otherwise. Also, for convenience and simplicity, the terms "connected to," "coupled with," "communicating with," and "coupled to" (which terms also refer to direct and/or indirect relationships between the connected, coupled and/or communicating elements unless the context of the term's use unambiguously indicates otherwise). Such terms may be used interchangeably, but these terms are also generally given their art-recognized meanings.

The present invention concerns methods and apparatuses for detecting and/or recovering an optical signal quickly and accurately, and enjoys particular advantages in optical network (e.g., PON) receivers and/or transceivers. A fast and accurate receiver and/or transceiver can be used in high bandwidth networks so that data is received and processed without error. By utilizing the present feed-forward signal detector, an optical receiver and/or transceiver can quickly determine a common-mode voltage of a received data signal and subsequently determine or set a decision threshold for the binary logic states of the received signal. Thus, the present invention avoids the problems associated with conventional optical receivers and/or transceivers (e.g., increased data processing time, data at the beginning of a data packet being erroneously processed or missed while changing or adjusting the decision threshold, etc.).

The invention, in its various aspects, will be explained in greater detail below with regard to exemplary embodiments.

An Exemplary Optical and/or Optoelectronic Network

Figure 2:
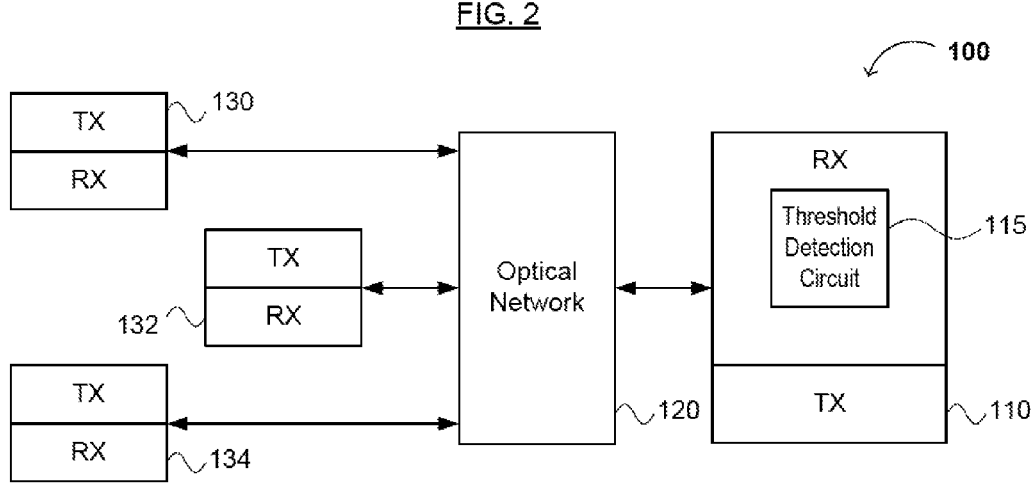
FIG. 2 is a diagram showing an exemplary optical and/or optoelectronic network according to the present invention.

FIG. 2 shows an exemplary optical and/or optoelectronic network 100 according to the present invention. As shown, optical and/or optoelectronic network 100 (e.g., a PON) comprises a first optical transceiver 130, a second optical transceiver 132, a third optical transceiver 134, optical network communications hardware 120, and optical receiver and/or transceiver 110. Optical receiver 110 comprises a threshold detection circuit 115. Optical transceivers 130, 132, and 134 each comprise a transmitter (TX) that transmits a data signal over the optical network (e.g., optical communications hardware) 120 to optical receiver 110. In many embodiments, the data signal comprises one or more data blocks, such as data packets, frames, pages, sectors, cells, payloads, etc.

Optical network communications hardware 120 (e.g., an optical distribution network [ODN], an OLT, etc.) may include, e.g., one or more multiplexers, demultiplexers, optical splitters, repeaters, etc. Thus, data signals received from the transceivers 130-134 may be time-multiplexed so that optical transceiver 110 can receive transmitted data from a particular transceiver 130, 132, and 134 (e.g., through a multiplexer) at a predetermined or preassigned time slot or window. In alternative embodiments, optical network communications hardware 120 may comprise circuitry configured to receive data signals from optical transceivers 130-134 (e.g., ONUs), select one of the received data signals to provide to optical transceiver 110, and provide the selected data signal to optical transceiver 110 at a predetermined time.

Figure 3:
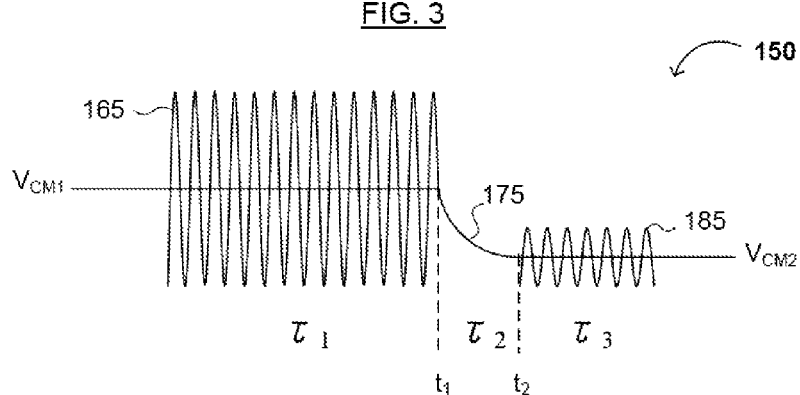
FIG. 3 is a graph illustrating exemplary data signals with different time constants according to the present invention.

Referring also now to graph 150 illustrated in FIG. 3, and as discussed above, for example, optical transceiver 130 provides a data packet via a first data signal 165 (e.g., a data signal having a common-mode voltage $V_{CM1}$) to optical receiver 110 through optical network communications hardware 120. Once the data packet is received, the threshold detection circuit 115 determines a voltage threshold using the common-mode voltage $V_{CM1}$ of first data signal 165. In the example of FIG. 3, the decision threshold is equal to $V_{CM1}$. However, in some embodiments, the decision threshold may be greater than and/or less than the common-mode voltage of the received signal (e.g., $V_{CM}\pm5\%$, 10%, etc., or $V_{CM}\pm0.1V$, 0.2V, 0.5V, etc.), or any other value(s) sufficient to ensure accurate detection and/or reception of the received data signal. For example, the decision threshold voltage for a binary "1" data bit may be $V_{CM}+0.1V$, whereas the decision threshold voltage for a binary "0" data bit may be $V_{CM}-0.1V$.

Additionally, when the first data signal 165 is received, the threshold detection circuit 115 processes the incoming data signal using a first, relatively high time constant, $\tau_1$. The first time constant is provided, e.g., by a first RC circuit in threshold determination circuit 115. Utilizing the first time constant $\tau_1$ ensures that the data packet is accurately received and processed, irrespective of the signal amplitude, signal data rate or data code length.

As shown, first data signal 165 is received up to a time $t_1$. At time $t_1$, first data signal 165 is no longer received by optical receiver 110. However, the optical network (e.g., optical network 100 in FIG. 2) knows that a second data signal is to be received at time $t_2$. Thus, to accurately receive the second data signal 185 at time $t_2$, the threshold detection circuit 115 changes its time constant at time $t_1$ to a second time constant $\tau_2$ significantly less than first time constant $\tau_1$. Activating the second time constant $\tau_2$ before the second data signal 185 is received enables the common-mode voltage $V_{CM1}$ of the first data signal 165 (or decision threshold voltage 175) to decay at a faster rate (e.g., at a rate determined by the second time constant $\tau_2$). In turn, this allows the decision threshold for the second data signal 185 to be quickly and accurately determined.

At time $t_2$, the second data signal 185 is received. As shown, the amplitude of second data signal 185 is much less than that of first data signal 165. Thus, the common-mode voltage and/or threshold decision of second data signal 185 is also much less than that of first data signal 165. In one embodiment, a second RC circuit (discussed below in greater detail with respect to FIGS. 5A-5C) having a significantly smaller time constant $\tau_2$ is used to enable the threshold detection circuit 115 to quickly change the common-mode voltage of an incoming signal (e.g., that of first data signal 165), and thus, the decision threshold for the second data signal 185. Utilizing a significantly smaller time constant and a relatively fast decay ensures that the decision threshold of threshold detection circuit 115 is sufficiently below the maximum amplitude of the second data signal 185 to set a usable threshold for an incoming data signal (e.g., second data signal 185) having a significantly smaller threshold. It is noted that when the second data signal 185 has an amplitude about the same as or greater than that of the first data signal 165, the problem of an inaccurately processed successive data signal generally does not arise.

Although FIG. 3 shows the decision threshold voltage 175 equal to or approximately equal to the common-mode voltage $V_{CM2}$ of the second data signal 185, such a relationship is not necessary for the invention to be effective. Decision threshold voltage 175 may be any value less than the maximum amplitude of the second data signal (e.g., $A_2$), preferably less than $x*A_2$, where $x\leq0.95$, 0.9, 0.85, etc., but greater than $y*A_2$, where $y\geq0.1$, 0.2, 0.25, etc. However, as discussed above, the decision threshold may be greater than and/or less than the common-mode voltage of the received signal (e.g., $V_{CM}\pm5\%$, 10%, etc., or $V_{CM}\pm0.1V$, 0.2V, 0.5V, etc.). At time $t_2$, to maintain a stable threshold decision voltage for the second data signal 185, threshold detection circuit 115 utilizes a slow RC response time (for example, that of a RC circuit different from the second RC circuit, such as the first RC circuit). When the first RC circuit receives the second data signal at time $t_2$, time constant $\tau_3$ is equal to the first time constant $\tau_1$.

As discussed below in greater detail, the present threshold detection circuit utilizes two or more time constants to accurately and quickly detect a new data packet in an optical data network.

An Exemplary Optical Receiver

Figure 4:
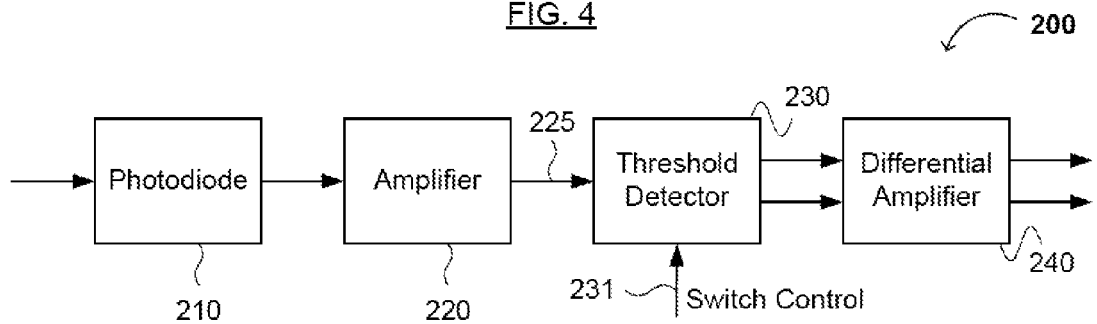
FIG. 4 is an exemplary block diagram of the optical receiver of FIG. 2.

FIG. 4 illustrates an exemplary optical receiver 200 including the present threshold detector 230. Generally, threshold detector 230 can be the same as threshold detection circuit 115 in FIG. 2. As shown, in FIG. 4, optical receiver 200 comprises a photodiode 210, an amplifier 220, a threshold detector 230, and a differential amplifier 240.

Photodiode 210 can be any device configured to receive an optical signal (e.g., from an optical transmitter such as optical transceiver 130, 132, or 134 in FIG. 2) and provide an electrical signal. For example, photodiode 210 can be an avalanche photodiode (APD) or a p-type/intrinsic/n-type (PIN) photodiode. Additionally, amplifier 220 can be any device configured to amplify an electrical signal and provide an amplified electrical signal. For example, amplifier 220 can include a transimpedance amplifier (TIA), a gain amplifier (e.g., a variable-gain amplifier), a buffer, or a combination thereof.

Furthermore, in one embodiment, threshold detector 230 comprises first and second threshold detection circuits (not shown; discussed in more detail below with respect to FIGS. 5A-5C) configured to receive an input signal and provide a differential signal. Additionally, threshold detector 230 can comprise a switch (not shown) activated by a control signal (e.g., control signal 231; discussed in greater detail below with respect to FIGS. 5A-5C). In this embodiment, control signal 231 generally selects between the first and second threshold detection or RC circuits. Control signal 231 can be provided by, e.g., a higher layer device in the optical network, or by control logic in the optical receiver 200 (e.g., a microcontroller, microprocessor, application specific integrated circuit [ASIC], field programmable gate array [FPGA], or complex programmable logic device [CPLD]). In general, the first and second threshold detection circuits have different time constants. Differential amplifier 240 can be any amplifier or device configured to amplify a received differential signal and provide a differential output signal.

As shown in FIG. 4, photodiode 210 receives an optical signal and provides an electrical signal to amplifier 220. The optical signal may be received from, e.g., an external source such as an optical transceiver configured to transmit an optical data signal over an optical network. Amplifier 220 amplifies the received electrical signal and provides a voltage signal 225 to threshold detector 230. Threshold detector 230 receives the voltage signal 225 and provides a differential signal to differential amplifier 240. Depending on the state of the switch in threshold detection circuit 230 (i.e., open or closed), the threshold detector 230 can apply a first time constant $\tau_1$ or a second time constant $\tau_2$ less than the first time constant $\tau_1$ to the voltage signal 225.

Stated differently, activation of the control signal opens or closes the switch, and changes (e.g., increases or decreases) a time constant at the input of the threshold detector 230. For example, when control signal 231 is active, a second time constant $\tau_2$ may be applied to the voltage signal 225 before a new data signal is received at photodiode 210. Doing so enables the common-mode voltage of voltage signal 225 to decay at a faster rate, so that a voltage threshold for the new data signal can be quickly determined. Differential amplifier 240 receives the differential input signal and provides a differential signal to components in the optical receiver and/or transceiver 200.

Thus, by utilizing the present threshold detector, the optical receiver and/or transceiver 200 can quickly determine a common-mode voltage of a received data signal and subsequently determine or set a decision threshold for the binary logic states of the received data signal(s).

A First Exemplary Threshold Detection Circuit

Figure 5A:
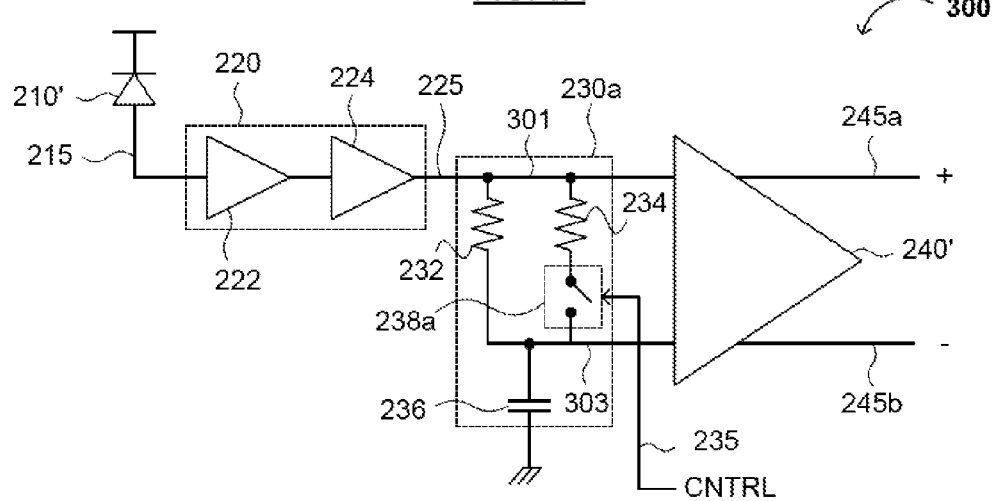
FIG. 5A is a diagram showing a first exemplary embodiment of the receiver circuitry of FIG. 4.

FIG. 5A shows a diagram illustrating a first exemplary embodiment 300 of the receiver circuitry 200 of FIG. 4. As shown, receiver circuitry 300 comprises circuitry similar to that of optical receiver 200 of FIG. 4, and those structures having the same identification numbers discussed below with respect to FIG. 5A may be substantially the same as those discussed above with respect to FIG. 4.

As shown, receiver circuitry 300 comprises photodiode 210', amplifier 220, threshold detection circuit 230a, and differential amplifier 240'. Photodiode 210' can be any device configured to receive an optical signal and provide an electrical signal (e.g., a photodiode similar to photodiode 210 discussed above with respect to FIG. 4, such as an APD, a PIN diode, etc.). The optical signal may be received from, e.g., an external source such as an optical transceiver configured to transmit an optical data signal over an optical network. In the embodiment of FIG. 5A, amplifier 220 comprises first and second amplifiers 222 and 224. In various embodiments, first amplifier 222 may comprise a TIA and second amplifier 224 may comprise a gain amplifier. In some embodiments, second amplifier 224 is a buffer. In other embodiments, second amplifier 224 is a variable gain amplifier.

Threshold detector 230a in FIG. 5A is a first embodiment of the threshold detector 230 in FIG. 4. In the embodiment shown in FIG. 5A, threshold detector 230a comprises first and second resistors 232 and 234, a capacitor 236, and a switch 238a (discussed below in greater detail). Specifically, first resistor 232 is coupled in parallel with second resistor 234, between nodes 301 and 303, and second resistor 234 is coupled in series with switch 238a. First resistor 232 is coupled in series with capacitor 236, which is also coupled to a ground source (e.g., a 0V potential) at a complementary electrode. Switch 238a is coupled in series between second resistor 234 and capacitor 236. Switch 238a is activated (e.g., opened or closed) by control signal 235 (e.g., a control signal similar to that discussed above with respect to FIG. 4, and discussed below in greater detail). Generally, first resistor 232 has a resistance value that is greater than that of second resistor 234. For example, the resistance (e.g., $R_2$) of second resistor 234 may be at least two times greater than the resistance (e.g., $R_1$) of first resistor 232. In some embodiments, $R_2 \geq z \cdot R_1$, where $z \geq 10$, 100, 1000, $10^6$, or even $10^9$. In any case, the resistance value of first resistor 232 is significantly greater than that of second resistor 234.

Additionally, in some embodiments, switch 238a of threshold detector 230a comprises a transistor (e.g., a bipolar junction transistor, or BJT; not shown), in which a first collector/emitter terminal of the transistor 238a is coupled to node 301, a base or control terminal is configured to receive a control signal (e.g., control signal 235), and a second emitter/collector terminal is coupled to node 303. Alternatively, switch 238a can comprise a MOSFET (not shown), in which a first source/drain terminal of the transistor 238a is coupled to resistor 234, the gate terminal of the transistor 238a is configured to receive a control signal (e.g., control signal 235), and a second source/drain terminal of the transistor 238a is coupled to node 303.

In many embodiments, threshold detector 230a comprises first and second threshold detection circuits. For example, the first threshold detection circuit (e.g., the first RC circuit) may comprise first resistor 232 and capacitor 236, where first resistor 232 and capacitor 236 are coupled at node 303. Additionally, the second threshold detection circuit (e.g., the second RC circuit) may comprise first and second resistors 232 and 234 and capacitor 236. A parallel connection of resistors 232 and 234 coupled at nodes 301 and 303 can decrease a time constant of (or optionally an impedance at) threshold detection circuit 230a with respect to the first RC circuit.

Differential amplifier 240 is a suitable example of the differential amplifier 240 in FIG. 4. That is, differential amplifier 240 is configured to receive a differential input signal and provide a differential output signal (e.g., differential signal 245a-b).

Figure 5B:
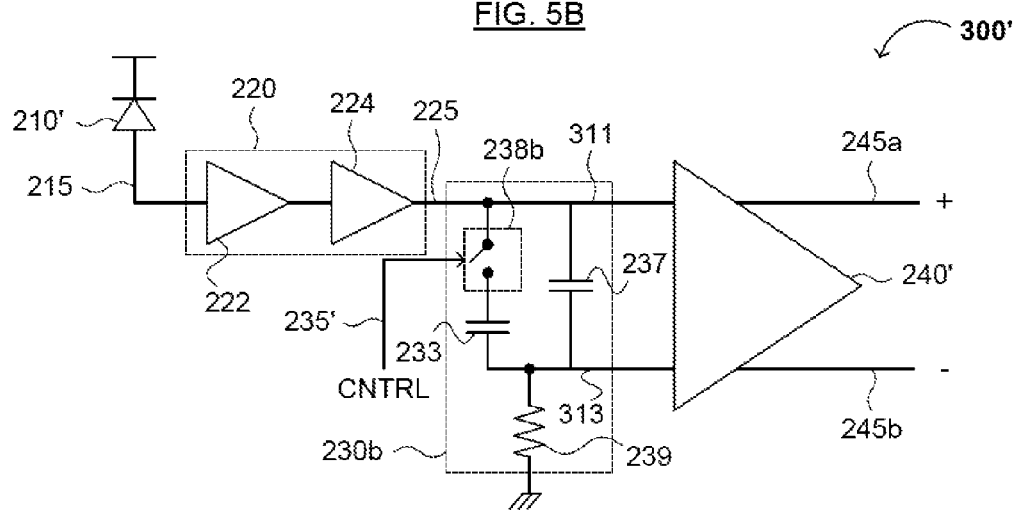
FIG. 5B is a diagram showing a second exemplary embodiment of the receiver circuitry of FIG. 4.
Figure 5C:
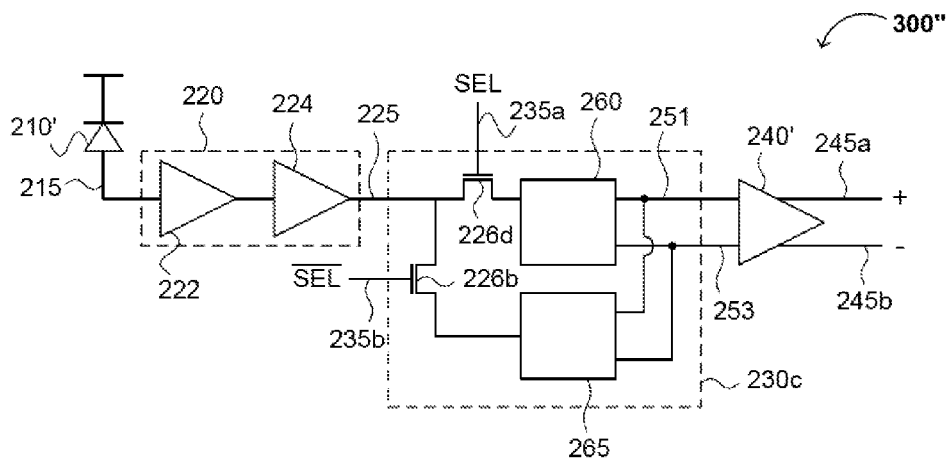
FIG. 5C is a diagram showing a third exemplary embodiment of the receiver circuitry of FIG. 4.

More specifically, as shown in FIG. 5A, photodiode 210' receives an optical signal (e.g., a first optical signal) and provides an electrical signal 215 to amplifier 220. For example, and also referring back to FIG. 3, photodetector 210' initially receives the first optical signal and converts it to first data signal 165 having a common-mode voltage $V_{CM1}$. In the embodiments of FIGS. 5A-C, the decision threshold (e.g., $V_{CM1}$) for determining the state of the optical signal 165 has been determined prior to time $t_1$. Prior to time $t_1$ in graph 150 of FIG. 3, while first data signal 165 is being received, switch 238a is in an open state. That is, no current flows through second resistor 234. Thus, when switch 238a is open, the first RC circuit, comprising the first resistor 232 and capacitor 236, and having a first time constant $\tau_1$, is selected. The first time constant $\tau_1$ has a relatively large value caused by the impedance between nodes 301 and 303. Switch 238a remains in the open state until time $t_1$.

Amplifier 220 receives the electrical signal 215 and provides a voltage signal 225 to threshold detector 230a at node 301. Nodes 301 and 303 of threshold detector 230a provide a differential input signal to differential amplifier 240'. Differential amplifier 240' provides a differential output signal 245a-b to other downstream circuitry in optical receiver 300.

As discussed above, threshold detector 230a comprises a switch 238a, which is activated (e.g., closed) and deactivated (e.g., opened) by a control signal 235. Control signal 235 can be provided by circuitry external to threshold detector 230a (e.g., circuitry in the optical receiver, such as a microcontroller, microprocessor, or MCU), or from a host in electrical communication with the optical receiver and/or transceiver 300. Additionally, control signal 235 can activate the switch 238a from about the time that the first data signal ends (e.g., is no longer received, at or about time $t_1$) to just prior to an optical data signal (e.g., the second data signal 185 in FIG. 3) being received (e.g., at time $t_2$) at photodiode 210', but preferably, at or just after the first data signal ends ($t_1$).

As shown in FIG. 3, at or about time $t_1$, control signal 235 is activated and switch 238a is closed. That is, optical signal 165 is no longer received at photodiode 210', and the common-mode voltage across nodes 301 and 303 (as shown in FIG. 5A) begins to decay (e.g., as shown by decision threshold voltage 175 in FIG. 3). When switch 238a is closed, resistor 234 is electrically connected in parallel with resistor 232, thus forming the second RC circuit. The second RC circuit has a lower resistance and a lower impedance than that of the first RC circuit as a result of the parallel connection of first resistor 232 and second resistor 234. The second RC circuit also has a common input at node 301 with the first RC circuit. As discussed above, the resistance of second resistor 234 (in the second RC circuit) may be at least two times greater than the resistance of first resistor 232 (in the first RC circuit). Because the capacitance provided by capacitor 236 is the same, the time constant $\tau_2$ of the second RC circuit is less than the time constant $\tau_1$ of the first RC circuit. Thus, closing switch 238a increases the rate of decay of the decision threshold voltage 175 and quickly decreases the steady-state voltage at node 301 to a voltage that is below the amplitude of the second data signal 185. Closing switch 238a also effectively discharges a voltage stored in the second RC circuit. Under some circumstances, closing switch 238a may effectively charge the second RC circuit. Discharging (or, under some circumstances, charging) the second RC circuit ensures that the decision threshold for the incoming data signal is sufficiently below the maximum amplitude of the incoming data signal so that a usable decision threshold for the incoming data signal can be quickly determined. Stated differently, by closing switch 238a and coupling the second RC circuit to the incoming data signal on node 301, the decision threshold for the second data signal 185 can be quickly determined and/or set (e.g., at the time that the second data signal 185 is received, or very shortly thereafter).

At time $t_2$, the second data signal 185 is received at photodiode 210', and control signal 235 is activated to open switch 238a. When switch 238a is opened at time $t_2$, and the first RC circuit having the first time constant $\tau_1$ is selected, the impedance of threshold detector 230a is increased to the same impedance as prior to time $t_1$. Thus, the first RC circuit utilizes a slower response time to accurately detect a data signal having a high signal rate and large data code length. That is, when switch 238a is opened, the first RC circuit is charged to the common-mode voltage of the second data signal 185.

Therefore, by using the present threshold detection circuit, the receiver or transceiver 300 can quickly determine a voltage threshold for a received data signal regardless of its signal strength or amplitude, and data transitions can be quickly detected (e.g., within 10 ns after the beginning of a new data packet).

A Second Exemplary Threshold Detection Circuit

FIG. 5B illustrates a second exemplary threshold detection circuit 300' according to the present invention. As shown, threshold detection circuit 300' comprises circuitry similar to that of threshold detection circuit 300 of FIG. 5A, and those structures having the same identification numbers discussed below with respect to FIG. 5B may be substantially the same as those discussed above with respect to FIG. 5A.

Specifically, threshold detection circuit (e.g., threshold detector) 300' comprises photodiode 210', amplifier 220, threshold detector 230b, and differential amplifier 240'.

Photodiode 210' can be the same or substantially the same as photodiode 210' discussed above with respect to FIG. 4 (e.g., an APD or a PIN diode). Similarly, transimpedance amplifier 222 can be the same or substantially the same as transimpedance amplifier 222 in FIG. 5A, and gain amplifier 224 may be the same or substantially the same as gain amplifier 224 in FIG. 5A. Similar to threshold detection circuit 230a in FIG. 5A, threshold detection circuit 230b may comprise first and second threshold detection circuits (e.g., RC circuits) configured to receive a single-ended input signal and provide a differential signal. Differential amplifier 240', similar to differential amplifier 240' in FIG. 5A, is configured to receive a differential input signal and provide a differential output signal 245a-b.

Threshold detector 230b in FIG. 5B is a second embodiment of the threshold detector 230 in FIG. 4. More specifically, threshold detector 230b comprises first and second capacitors 233 and 237, a resistor 239, and a switch 238b (e.g., a BJT or a MOS transistor, and similar to switch 238a in FIG. 5A). Specifically, first capacitor 237 is coupled in parallel between nodes 311 and 313 with switch 238b and second capacitor 233. Second capacitor 233 is coupled in series with switch 238b. First capacitor 237 is coupled in series with resistor 239, which is, in turn, coupled at an opposite terminal to a ground source (e.g., a 0V potential). Switch 238b is activated (e.g., opened or closed) by control signal 235 (e.g., a control signal similar to control signal 235 in FIG. 5A; discussed below in greater detail). Generally, second capacitor 233 has a capacitance value that is greater than that of first capacitor 237, although it can be the same. For example, the capacitance (e.g., $C_2$) of second capacitor 233 may be at least ten times greater than the capacitance (e.g., $C_1$) of first capacitor 237. In some embodiments, $C_2 \geq w^*C_1$ (e.g., $w \geq 10$, 100, 1000, or $10^6$). In any case, the capacitance value of second capacitor 233 is generally significantly greater than that of first capacitor 237.

As discussed above, threshold detector 230b may comprise first and second RC circuits. For example, the first RC circuit may comprise first capacitor 237 and resistor 239, where first capacitor 237 and resistor 239 are coupled at node 313. Additionally, the second RC circuit may comprise first and second capacitors 237 and 233 and resistor 239. The parallel connection of first and second capacitors 237 and 233 coupled at nodes 311 and 313 can increase the time constant of the threshold detection circuit 230 with respect to the first RC circuit. In such embodiments, the capacitance of threshold detector 230b is increased by selecting the second RC circuit.

Threshold detection circuit 300, similar to threshold detection circuit 300 of FIG. 5A, comprises a switch 238b, which is activated (e.g., closed) and deactivated (e.g., opened) by a control signal 235. Control signal 235 (e.g., similar to control signal 235 discussed above in FIG. 5A) can be provided by circuitry external to threshold detector 230b but still within receiver 300, or by circuitry external to the optical receiver 300 (e.g., a host coupled to optical receiver 300).

The first RC circuit is selected when the switch 238b is closed by control signal 235. For example, once a data signal is received (e.g., optical data signal 165 in FIG. 3), switch 238b remains in the closed state until the signal ends (e.g., time $t_1$ in graph 150 of FIG. 3). At that time (e.g., $t_1$ in the embodiment of FIG. 3), control signal 235 is deactivated and switch 238b is opened. When switch 238b is opened (e.g., when the first data signal 175 is no longer received), the second capacitor 233 is electrically disconnected from first capacitor 237, thus forming and either charging or discharging the second RC circuit. As discussed above, the second RC circuit has a time constant $\tau_2$ less than that of the first RC circuit. Therefore, opening switch 238b increases the rate of decay of the decision threshold voltage 175 and quickly decreases the steady-state voltage at node 311 to a voltage that is below the amplitude of the second data signal 185. That is, charging or discharging the second RC circuit 265 in this manner ensures that the decision threshold for the incoming data signal is sufficiently below the maximum amplitude of the incoming data signal (e.g., data signal 185) so that a usable decision threshold for the incoming data signal can be quickly determined. Stated differently, by decreasing the steady-state voltage at node 301, the decision threshold for the second data signal 185 can be quickly determined.

When switch 238b is closed at time $t_2$, the first RC circuit having the first time constant $\tau_1$ is selected, and the time constant of threshold detector 230b is increased. That is, the first RC circuit is charged to the common-mode voltage of the second data signal 185. Thus, the first RC circuit utilizes a slower response time to stably maintain the detection threshold voltage and accurately detect a data signal having a high signal rate and that may be received at a predetermined time. Furthermore, by using threshold detection circuit 230b, the optical receiver 300 can quickly determine a voltage threshold for a received data signal, and data transitions can be quickly detected (e.g., within 10 ns after the beginning of a new data packet).

A Third Exemplary Threshold Detection Circuit

FIG. 5C illustrates a third exemplary threshold detection circuit 300" according to the present invention. As shown, threshold detection circuit 300" comprises circuitry similar to that of threshold detectors 300 and 300' of FIGS. 5A-B, and those structures having the same identification numbers discussed below with respect to FIG. 5C may be substantially the same as those discussed above with respect to FIGS. 5A-B.

Threshold detector 230c in FIG. 5C is a third embodiment of the threshold detector 230 in FIG. 4. Specifically, threshold detector 230c comprises first and second RC circuits 260 and 265, respectively. The first RC circuit 260 has a first time constant $\tau_1$, and the second RC circuit 265 has a second time constant $\tau_2$ less than the first time constant $\tau_1$. For example, the first RC circuit 260 may be the same or substantially the same as the first RC circuit discussed above with respect to FIGS. 5A-B. In one embodiment, the first RC circuit 260 may comprise a capacitor and a resistor. However, the second RC circuit 265 may comprise a capacitor and a resistor having different capacitance and/or resistance values than the capacitor and resistor in the first RC circuit. For example, one of the capacitor and resistor in the second circuit may have the same respective capacitance or resistance value as that of the first RC circuit, and the other of the capacitor and resistor may have a different capacitance or resistance value than that of the first RC circuit. In an alternative embodiment, the resistor and capacitor of the second RC circuit have different respective resistance and capacitance values than those of the first RC circuit. In further embodiments, each of the first and second RC circuits has a resistor and a capacitor, and one of the first and second RC circuits has an additional RC component. Regardless of the specific RC configuration of second RC circuit 265, second RC circuit 265 is configured to decrease a time constant of the threshold detection circuit 230c relative to first RC circuit 260.

Threshold detection circuit 300", similar to threshold detection circuits 300 and 300' of FIGS. 5A and 5B, comprises switches 226b and 226d, which are activated (e.g., closed) and deactivated (e.g., opened) by control signal(s) 235a and 235b. While control signal(s) 235a and 235b can be independent signals, in one embodiment, they are complementary to each other, and thus, can be represented by a single control signal and its complement. Similar to control signal 235 in FIG. 5A, the control signal(s) 235a and 235b can be provided by circuitry external to threshold detector 230c but within receiver 300", or by circuitry external to the optical receiver 300" (e.g., a host coupled to optical receiver 300"). Generally, one of the differential outputs from first and second RC circuits 260 and 265 is provided at any given time to differential amplifier 240'.

In one embodiment of FIG. 5C, the first RC circuit 260 is selected when the switch 226d is closed and the switch 226b is opened by complementary control signal 235a-b. For example, when a data signal (e.g., a single-ended data signal) is received (e.g., optical data signal 165 in FIG. 3), switch 226d remains closed and switch 226b remains opened until the data signal ends (e.g., time $t_1$ in graph 150 of FIG. 3). At that time (e.g., $t_1$ in FIG. 3), control signal 235a-b changes state, and switch 226d is opened and switch 226b is closed. When switch 226b is closed, second RC circuit 265 is electrically connected between node 225" and differential amplifier 240', and first RC circuit 260 is disconnected, thereby decreasing the time constant of the threshold detection circuit 230c. That is, the second RC circuit 265 is effectively discharged to some extent, but under certain conditions, the second RC circuit 265 may be charged. As discussed above, the second RC circuit 260 has a time constant $\tau_2$ (and, in some embodiments, an impedance) less than that of the first RC circuit 260. Therefore, closing switch 226b increases the rate of decay of the decision threshold voltage 175 and quickly decreases the steady-state voltage between nodes 251 and 253 to a voltage that is below the amplitude of the second data signal 185. Charging or discharging the second RC circuit 265 in this manner ensures that the decision threshold for the incoming data signal is sufficiently below the maximum amplitude of the incoming data signal (e.g., data signal 185) so that a usable decision threshold for the incoming data signal can be quickly determined. Stated differently, by decreasing the steady-state voltage between nodes 251 and 253, the decision threshold for the second data signal 185 can be quickly determined.

When the next data signal is received (e.g., at time $t_2$ in FIG. 3), switch 226b is opened and switch 226d is closed, and the first RC circuit 260 having the first time constant $\tau_1$ is selected. That is, the first RC circuit is charged to the common-mode voltage of second data signal 185. In one example, the impedance of threshold detector 230c is increased by selecting the first RC circuit 260. In another example, the capacitance of threshold detector 230c is decreased by selecting the first RC circuit 260. Thus, the first RC circuit 260 utilizes a slower response time to accurately maintain a data detection threshold and determine the state of a data signal having a high signal rate and/or known starting and ending time. Furthermore, by using threshold detection circuit 230c, the optical receiver 300" can quickly determine a voltage threshold for a received data signal, and data transitions can be quickly detected (e.g., within 10 ns after the beginning of a new data packet).

An Exemplary Optical and/or Optoelectronic Transceiver

Figure 6:
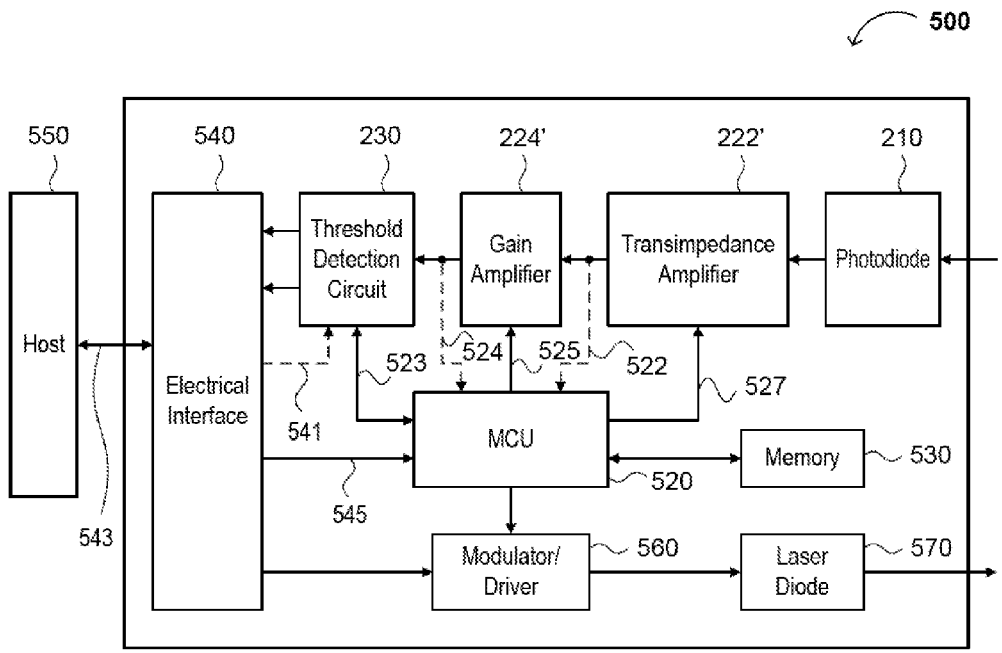
FIG. 6 is a diagram showing an exemplary optical and/or optoelectronic transceiver according to the present invention.

FIG. 6 shows an exemplary optical and/or optoelectronic transceiver 500 according to the present invention. As shown, optical transceiver 500 comprises photodiode 210, transimpedance amplifier 222', gain amplifier 224', threshold detection circuit 230, electrical interface 540, micro control unit (MCU) 520, memory 530, modulator and/or driver 560, and laser diode 570. Thus, optical and/or optoelectronic transceiver 500 comprises some of the same structures as (or structures similar to) those of optical and/or optoelectronic receiver 200 of FIG. 4, where structures in optical and/or optoelectronic receiver 200 having the same identification numbers discussed below with respect to FIG. 6 may be the same or substantially the same as those discussed above with respect to FIG. 4.

Photodiode 210 can be the same or substantially the same as photodiode 210 discussed above with respect to FIG. 4. For example, photodiode 210 may be an APD or a PIN diode. Similarly, transimpedance amplifier 222' may be the same or substantially the same as transimpedance amplifier 222 in FIG. 5A, and gain amplifier 224' may be the same or substantially the same as gain amplifier 224 in FIG. 5A. Threshold detection circuit 230 can be the same as or substantially the same as any of threshold detectors 230a, 230b, or 230c discussed above with respect to FIGS. 5A-C. For example, threshold detector 230 may comprise first and second RC circuits configured to receive a single-ended input signal and provide a differential signal. Additionally, threshold detector 230 may comprise a switch activated by one of the control signals 523 and 541.

Electrical interface 540 can be any interface capable of accurately transferring data and/or signals (e.g., signal 545 and/or signal 541) between an external host 550 and components of the transceiver 500 (e.g., threshold detection circuit 230, MCU 520, modulator and/or driver 560). Additionally, MCU 520 can be a microprocessor, microcontroller, FPGA, ASIC, or CPLD configured to control and/or adjust various functions of optical transceiver 500. For example, MCU 520 can automatically adjust the amplification provided by gain amplifier 224' or transimpedance amplifier 222' using an automatic gain control (AGC) scheme and/or algorithm, and determine a voltage threshold (e.g., a decision threshold voltage) using threshold detection circuit 230. MCU 520 may also receive one or more signals 545 from electrical interface 540 and provide a signal 523 configured to open or close a switch in threshold detector 230.

Memory 530 is configured to store data (e.g., AGC targets, the decision threshold voltage, etc.) from MCU 520 or for use by MCU 520. Additionally, MCU 520 may also provide a signal (e.g., a current adjustment signal) to modulator and/or driver 560. Modulator and/or driver 560 is generally configured to adjust a driving current provided to laser diode 570. A similar signal can be provided from the external host 550 through electrical interface 540. Laser diode 570 (e.g., included in or coupled to a transmitter optical subassembly [TOSA], not shown) may comprise a directly modulated laser (DML), an electro-absorption modulated laser (EML), or a distributed feedback laser diode (DFB-LD).

Optical and/or optoelectronic transceiver 500 is configured to receive an optical data signal (e.g., a first data signal) at photodiode 210. The optical data signal is converted by photodiode 210 to an electrical signal, which is then provided to transimpedance amplifier 222'. Transimpedance amplifier 222' receives the electrical signal (e.g., electrical signal 215 of FIG. 5A) and provides a voltage signal 522 to gain amplifier 224'. Gain amplifier 224' provides an amplified voltage signal 524 to threshold detection circuit 230. Threshold detection circuit 230 receives the amplified electrical signal 524 (which is generally single-ended) and provides a differential signal to electrical interface 540. Electrical interface 540 is coupled to each of threshold detection circuit 230 and MCU 520 via one or more busses 541 and 523, respectively. Electrical interface 540 may thus receive differential data from threshold detection circuit 230, provide a control signal (e.g., received from an external host) to threshold detection circuit 230, transfer data to modulator and/or driver 560, and/or communicate with MCU 520 (e.g., via signal 545). For example, in one alternative embodiment, electrical interface 540 can communicate with MCU 520 to select the impedance and/or time constant of threshold detection circuit 230.

More specifically, MCU 520 may receive data signals from circuitry in transceiver 500 (e.g., gain amplifier 224', transimpedance amplifier 222', threshold detection circuit 230, memory 530, etc.). MCU 520 may also control circuitry in transceiver 500 (e.g., threshold detection circuit 230, gain amplifier 224', etc.). For example, MCU 520 may be configured to receive voltage signal 522 from transimpedance amplifier 222', determine the amplitude of voltage signal 522, and provide a feedback signal 527 to transimpedance amplifier 222'. The feedback signal 527 can be configured to adjust (e.g., increase or decrease) the amplitude of the voltage signal 522. Similarly, MCU 520 can be configured to receive amplified voltage signal 524 from gain amplifier 224', determine the gain of amplified voltage signal 524, and provide a feedback signal 525 or 527 to gain amplifier 224' and/or transimpedance amplifier 222'. Feedback signal 525 can be configured to adjust (e.g., increase or decrease) the gain of gain amplifier 224'.

Additionally, MCU 520 may be configured to provide an internal control signal 523 to threshold detector 230. The state of the internal control signal 523 can be controlled by a signal internal to optical transceiver 500. For example, internal control signal 523 can be time-based (e.g., using a timer and/or delay circuitry in the MCU 520, alone or in combination with data stored in memory 530). In one embodiment, a signal 545 is provided by electrical interface 540 to MCU 520, which then provides signal 523 to threshold detection circuit 230. In such an embodiment, signal 545 can activate a timer or pass through a so-called "one-shot" delay circuit in MCU 520. Settings in the timer can be programmed and/or determined by information in memory 530, such as indications of the beginning and ending times of the data signals (e.g., packets, frames, blocks, etc.) of known length and known inter-signal spacing, as well as of known delays between data signals. Signal 523 may activate (e.g., open or close) a switch in threshold detector 230 to select (e.g., change, increase or decrease) a time constant (or, optionally, an impedance or capacitance) of threshold detector 230. The switch in threshold detector 230 may activate or deactivate (e.g., charge or discharge) first and second RC circuits in threshold detector 230.

Additionally, the time constant of threshold detector 230 may be selected (e.g., changed, increased or decreased) by external control signal 543. For example, electrical interface 540 may receive an external control signal on bus 543 from external host 550, and provide control signal 541 to threshold detector 230. The state of control signal 541, for example, can be controlled by external host 550, which is in electrical communication with the transceiver 500 (e.g., via data and control signals on bus 543). In such embodiments, electrical interface 540 receives the external control signal on bus 543 from the external host 550 and provides the control signal directly to threshold detector 230 (e.g., as control signal 541).

Thus, by using threshold detection circuit 230, the optical transceiver 500 can quickly and accurately determine a common-mode voltage and/or a voltage threshold for a next received data signal, and data transitions in the next received data signal can be quickly detected. That is, data at the beginning of a successive received data signal in a predetermined time slot can be correctly processed since the voltage threshold determination process for the successive data signal is accelerated prior to reception of the second data signal. As a result, the present optical and/or optoelectronic transceiver 500 is configured to quickly and accurately determine a common-mode voltage for data signals having different amplitudes, received from multiple ONUs in different time periods or time slots.

An Exemplary Method for Receiving a Signal

Figure 7:
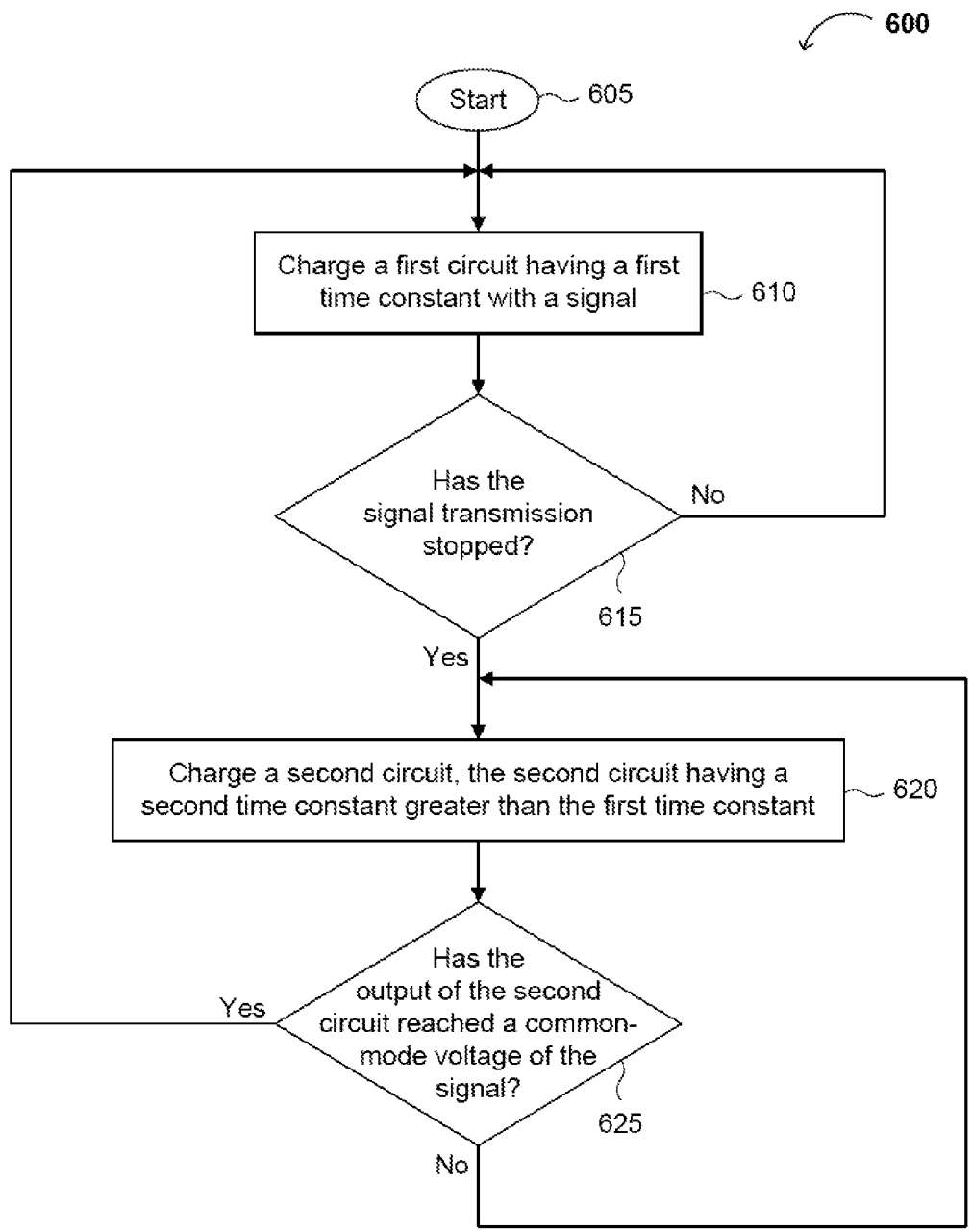
FIG. 7 is a flowchart showing an exemplary method for receiving a signal according to the present invention.

FIG. 7 shows a flow chart 600 reflecting an exemplary method for receiving data signals in a "many-to-one" optical or optoelectronic network (such as a passive optical network, or PON) according to the present invention. As shown, at 605, the method begins, and at 610, a first circuit having a first time constant is charged with a first data signal. Charging the first circuit with the first data signal can comprise coupling the first circuit with the data signal (e.g., opening or closing a switch using a control signal). In further embodiments, the first circuit comprises a switch configured to receive a signal (e.g., a control signal) that opens or closes the switch. In some embodiments, the switch is in a "feed forward"-based signal detector (e.g., threshold detectors 230a-c of FIGS. 5A-C, discussed above). In some embodiments, the first data signal is an optical data signal received from an optical transmitter or transceiver (e.g., optical transceiver 130 in FIG. 2) that has been converted to an electrical signal by an optical receiver (e.g., by photodiode 210 in optical receiver 200 of FIG. 4). In some embodiments, the first circuit comprises a RC circuit (e.g., a first RC circuit).

At 615, the method determines whether the first data signal transmission has stopped or is no longer received. For example, determining whether the first data signal transmission has stopped or is no longer received may comprise receiving an external signal (e.g., from external host 550 in FIG. 6) indicative of the end of the signal transmission. Alternatively, determining whether the first data signal transmission has stopped or is no longer received may comprise determining whether a timer or counter configured to change the state of the control signal that couples the first circuit to the data signal has reached a predetermined value. In general, the predetermined value is equal or equivalent to the length of time allotted to the first data signal (e.g., the time slot for the first data block). If the first data signal transmission has not stopped and/or is still being received, the method continues at 610 and charges the first circuit with the signal. When the first data signal transmission has stopped, the method proceeds to 620.

At 620, a second circuit having a second time constant less than the first time constant is charged (or discharged, as the case may be). Charging or discharging the second circuit, for example, may comprise opening or closing a switch (e.g., switch 238a in FIG. 5A) that is in electrical communication with the second circuit. In some embodiments, charging or discharging the second circuit comprises decreasing an impedance presented to the signal (e.g., by applying a control signal to the switch in the receiver circuitry). In alternative embodiments, charging or discharging the second circuit comprises decreasing a capacitance on the input node and/or presented to the signal (e.g., by applying a control signal to the switch in the receiver circuitry). Additionally, in some embodiments, the second circuit also comprises a RC circuit (e.g., a second RC circuit). In some embodiments, each of the first and second RC circuits comprises a first resistor and a first capacitor, and one of the first and second RC circuits comprises a third RC component. In one implementation, the first RC circuit further comprises a second capacitor, and in another implementation, the second RC circuit further comprises a second resistor. In alternative embodiments, the first RC circuit comprises a first resistor and a first capacitor, and the second RC circuit comprises a second resistor and a second capacitor.

Charging or discharging the second RC circuit ensures that the decision threshold for the incoming data signal is sufficiently below the maximum amplitude of the incoming data signal so that a usable decision threshold for the incoming data signal can be quickly determined. That is, charging (or discharging) the second RC circuit to an output voltage less than the amplitude of the incoming data signal enables the "feed forward" signal detector to quickly determine a common-mode voltage for a second received data signal, and subsequently determine or set a decision threshold for the binary logic states of the second received signal.

At 625, the method determines whether the output of the second circuit has reached a common-mode voltage of the second data signal. In some embodiments, the method further comprises setting a decision threshold voltage for the second received data signal. In one embodiment, the decision threshold voltage is the common-mode voltage of the second data signal. In other embodiments, the decision threshold voltage is a voltage that is greater than and/or less than the common-mode voltage of the received signal (e.g., $V_{CM}\pm 5\%$, 10%, etc., or $V_{CM}\pm 0.1V$, 0.2V, 0.5V, etc.), or any other value(s) sufficient to ensure accurate detection and/or reception of the signal. For example, the decision threshold voltage for a binary "1" data bit may be $V_{CM}+0.1V$, whereas the decision threshold voltage for a binary "0" data bit may be $V_{CM}-0.1V$.

In various embodiments, determining whether the output of the second circuit has reached a common-mode voltage (and, optionally, setting a decision threshold voltage) comprises coupling an output of the second circuit to a MCU (or, e.g., a microcontroller, microprocessor, ASIC, FPGA, or CPCD) configured to make such a determination or setting. As long as the output of the second circuit has not reached the common-mode voltage of the second data signal, the method continues at 620 and charges or discharges the second circuit. When the output of the second circuit has reached the common-mode voltage of the second data signal (or a value that is approximately equal to the common-mode voltage), the method returns to 610 and charges or discharges the first circuit with a newly received data signal. When no signal is received at 610, the method ends.

Thus, by utilizing first and second RC circuits having first and second respective time constants, the present method is capable of quickly and accurately detecting a new data signal and determining a decision threshold for received data signals (e.g., data signals received from multiple ONUs at various amplitudes). Additionally, the present threshold detector avoids the problems associated with conventional optical receivers and/or transceivers (e.g., increased data processing time, data at the beginning of a data packet being erroneously processed or missed while changing or adjusting the decision threshold, etc.).

CONCLUSION/SUMMARY

Thus, the present invention provides a detection circuit and methods of receiving a signal (e.g., an optical signal). The present invention advantageously provides fast and accurate data signal detection in optical and/or optoelectronic receivers and/or transceivers. Stated differently, by utilizing the present circuits and/or methods, data at the beginning of a next received data signal can be correctly processed since the voltage threshold determination process for the next data signal is initiated prior to the next data signal being received.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of receiving a plurality of optical signals in an optical receiver, the method comprising:
    receiving a first optical signal of the plurality of optical signals with a photodiode in the optical receiver and providing a first electrical signal therefrom;
        charging a first circuit in the optical receiver having a first time constant with the first electrical signal, the first electrical signal having a first common-mode voltage; and
        when said first electrical signal is no longer received, charging or discharging a second circuit, said second circuit having (i) a common input and a common output with said first circuit and (ii) a second time constant substantially less than said first time constant which allows the common-mode voltage of the first electrical signal to decay to a value below an amplitude of a second electrical signal;
    receiving a second optical signal of the plurality of optical signals with the photodiode and providing the second electrical signal therefrom;
        prior to or simultaneously with receiving the second optical signal, selecting the first circuit to be charged by the second electrical signal;
        recharging the first circuit with the second electrical signal; and
        determining a decision threshold for a second electrical signal using the first circuit.

2. The method of claim 1, wherein charging or discharging said second circuit comprises one of opening or closing a switch, and selecting the first circuit comprises the other of opening or closing the switch.

3. The method of claim 2, wherein said switch is coupled to the common output, and charging or discharging said second circuit comprises closing said switch to decrease an impedance presented to said common input.

4. The method of claim 2, wherein said switch is coupled to an input of said second circuit, and charging or discharging said second circuit comprises opening said switch to decrease a capacitance presented to said common input.

5. The method of claim 1, wherein said first circuit comprises a first RC circuit, and said second circuit comprises a second RC circuit.

6. The method of claim 5, wherein each of said first and second RC circuits comprises a first resistor and a first capacitor, and one of said first and second RC circuits comprises a third RC component.

7. The method of claim 1, wherein charging or discharging said second circuit allows the common-mode voltage of the first electrical signal to decay, and after the common-mode voltage of the first electrical signal is allowed to decay, the first circuit is selected to be charged, the second optical signal is received, and the second electrical signal is provided.

8. An optical receiver, comprising:
    a photodiode configured to receive an optical signal and provide an electrical signal;
        a first circuit having a first time constant and receiving the electrical signal;
        a second circuit having (i) a common input and a common output with said first circuit and (ii) a second time constant, said second time constant being substantially less than said first time constant and allowing a common-mode voltage thereon to decay or change at a faster rate than the first circuit, wherein the common-mode voltage can have a value greater than an amplitude of the electrical signal;
    a switch configured to (i) charge said first circuit with the electrical signal when the switch is in a first state, and (ii) charge or discharge said second circuit when the switch is in a second state, the switch having the second state when said electrical signal is no longer received at said common input; and
    logic configured to place said switch in the first state whenever said electrical signal is received at said common input for an entire duration of said electrical signal, place said switch in the second state when said electrical signal is not received at said common input, and determine a decision threshold for binary logic states of the electrical signal received by the detection circuit based on the common-mode voltage.

9. The optical receiver of claim 8, wherein (i) said electrical signal is a single-ended signal, and (ii) each of said first and second circuits have a differential output.

10. The optical receiver of claim 9, further comprising a differential amplifier configured to receive said differential outputs of said first and second circuits.

11. The optical receiver of claim 8, wherein said first circuit comprises a first RC circuit, and said second circuit comprises a second RC circuit.

12. The optical receiver of claim 11, wherein each of said first and second RC circuits comprises a first resistor and a first capacitor, and one of said first and second RC circuits comprises a third RC component.

13. The optical receiver of claim 11, wherein said first circuit has a resistance that is substantially greater than a resistance of said second circuit.

14. The optical receiver of claim 11, wherein said first circuit has a capacitance that is substantially greater than a capacitance of said second circuit.

15. The optical receiver of claim 8, wherein:
    said logic comprises a microcontroller or microprocessor configured to execute one or more commands to open or close said switch; and said optical receiver further comprises a memory in electrical communication with said microcontroller or microprocessor.

16. The optical receiver of claim 15, further comprising an amplifier configured to amplify said electrical signal.

17. The optical receiver of claim 16, wherein said amplifier comprises a transimpedance amplifier and a gain amplifier.

18. The optical receiver of claim 15, wherein each of said first circuit and said second circuit have a common differential output, and the optical receiver further comprises a differential amplifier having an input configured to receive said common differential output of said first circuit and said second circuit.

19. The optical receiver of claim 15, wherein said microprocessor or microcontroller is further configured to execute one or more commands configured to recharge said first circuit when said electrical signal is received again at said common input.

20. The optical receiver of claim 8, wherein said logic is configured to place said switch in the second state and allow the common-mode voltage of the electrical signal to decay, then after the common-mode voltage of the electrical signal is allowed to decay to a value less than an amplitude of a successive electrical signal, place said switch in the first state.

* * * * *